(12) United States Patent
Niu et al.

(10) Patent No.: US 11,859,867 B2
(45) Date of Patent: Jan. 2, 2024

(54) PREMIXED LOW-NITROGEN GAS BOILER

(71) Applicants: Xi'an Jiaotong University, Xi'an (CN); Henan Yuanda Boiler Corporation Ltd, Zhoukou (CN)

(72) Inventors: Yanqing Niu, Xi'an (CN); Mao Tian, Xi'an (CN); Jun Zhao, Xi'an (CN); Hongzhong Liu, Xi'an (CN)

(73) Assignees: Xi'an Jiaotong University, Xi'an (CN); Henan Yuanda Boiler Corporation Ltd, Zhoukou (CN)

( * ) Notice: Subject to any disclaimer, the term of this patent is extended or adjusted under 35 U.S.C. 154(b) by 0 days.

(21) Appl. No.: 18/053,776

(22) Filed: Nov. 9, 2022

(65) Prior Publication Data

US 2023/0349591 A1    Nov. 2, 2023

(30) Foreign Application Priority Data

Apr. 29, 2022  (CN) .......................... 202210464524.0

(51) Int. Cl.
*F24H 1/40* (2022.01)
*F23D 14/24* (2006.01)
(Continued)

(52) U.S. Cl.
CPC .............. *F24H 1/40* (2013.01); *F23D 14/02* (2013.01); *F23D 14/24* (2013.01); *F23D 14/62* (2013.01);
(Continued)

(58) Field of Classification Search
CPC ............................................ F23D 2900/14041
See application file for complete search history.

(56) References Cited

U.S. PATENT DOCUMENTS

2019/0041062 A1* 2/2019 Zhao ....................... F23D 11/36

FOREIGN PATENT DOCUMENTS

| CN | 109442404 A | * | 3/2019 | ............ F23D 14/02 |
| CN | 111795497 A | * | 10/2020 | ............ F23D 14/02 |

(Continued)

OTHER PUBLICATIONS

CN-213480215-U English translation (Year: 2021).*
CN-111795497-A English translation (Year: 2020).*
CN-109442404-A English translation (Year: 2019).*

*Primary Examiner* — Steven S Anderson, II
*Assistant Examiner* — Kurt J Wolford
(74) *Attorney, Agent, or Firm* — HoustonHogle LLP

(57) ABSTRACT

A premixed low-nitrogen gas boiler is provided, which includes a reversed flow-swirl mixer being opposite mixing of natural gas and air. A flow deflector is arranged at a gas mixture outlet of the reversed flow-swirl mixer. An upper flow equalizing plate and a lower flow equalizing plate are arranged below the flow deflector, the upper flow equalizing plate is positioned above the lower flow equalizing plate, and a channel for enhancing mixing of gas mixture is formed between the upper flow equalizing plate and the lower flow equalizing plate. A comb-shaped water-cooled burner is arranged at the rear end of the lower flow equalizing plate, a combustion chamber is arranged at the rear end of the comb-shaped water-cooled burner, hearth tube bundles are arranged in a ladder-shaped convergent hearth, and the hearth tube bundles form an inner loop with a working medium water-steam mixture in a hearth water tank.

9 Claims, 5 Drawing Sheets

(51) Int. Cl.
*F23D 14/78* (2006.01)
*F23D 14/62* (2006.01)
*F23D 14/70* (2006.01)
*F23D 14/02* (2006.01)

(52) U.S. Cl.
CPC ............ *F23D 14/70* (2013.01); *F23D 14/78* (2013.01); *F23D 2214/00* (2013.01); *F23D 2900/14021* (2013.01)

(56) References Cited

FOREIGN PATENT DOCUMENTS

| | | | |
|---|---|---|---|
| CN | 112555828 A | | 3/2021 |
| CN | 213480215 U | * | 6/2021 |
| EP | 3135997 A1 | | 3/2017 |

* cited by examiner

PREMIXED LOW-NITROGEN GAS BOILER

CROSS-REFERENCE TO RELATED APPLICATION

This patent application claims the benefit and priority of Chinese Patent Application No. 202210464524.0 filed on Apr. 29, 2022, the disclosure of which is incorporated by reference herein in its entirety as part of the present application.

TECHNICAL FIELD

The present disclosure belongs to the technical field of gas boilers, and in particular relates to a premixed low-nitrogen gas boiler.

BACKGROUND

At present, low-nitrogen combustion technologies are widely used, such as graded combustion, flue gas recirculation, oxygen-enriched combustion, rich-lean combustion. Meanwhile, there are also denitrification technologies such as SCR (Selective Catalytic Reduction) and SNCR (Selective Non-catalytic Reduction). However, the technologies, such as oxygen-enriched combustion, are only at the experimental stage, and cannot be applied in actual production. And, the technologies, such as rich-lean combustion, are widely used, and difficult to be popularized and applied due to the high cost of the technologies such as SCR and SNCR.

SUMMARY

To overcome the technical problem above, an objective of the present disclosure is to provide a premixed low-nitrogen gas boiler. The premixed low-nitrogen gas boiler can improve the uniformity of the gas mixture, thus guaranteeing the combustion stability and reducing the backfire possibility of combustion. The premixed low-nitrogen gas boiler can improve the radiant heating capacity of the hearth, thus greatly reducing the local temperature at an outlet of the burner and the bulk temperature of the hearth and achieving low-temperature low-nitrogen combustion. Meanwhile, the premixed low-nitrogen gas boiler can be popularized and applied in a large scale due to the low cost thereof.

To achieve the objective, the present disclosure adopts the technical solution as follows.

A premixed low-nitrogen gas boiler includes a reversed flow-swirl mixer 1, a flow deflector 2, an upper flow equalizing plate 3, a lower flow equalizing plate 4, a comb-shaped water-cooled burner 5, a combustion chamber 6, hearth tube bundles 7, a ladder-shaped convergent hearth 8, and an exhaust port 10.

The reversed flow-swirl mixer 1 is capable of opposite mixing of natural gas and air. The flow deflector 2 is arranged at a gas mixture outlet of the reversed flow-swirl mixer 1. The upper flow equalizing plate 3 and the lower flow equalizing plate 4 are arranged below the flow deflector 2. The upper flow equalizing plate 3 is located above the lower flow equalizing plate 4, and a channel for enhancing mixing of gas mixture is formed between the upper flow equalizing plate 3 and the lower flow equalizing plate 4. The comb-shaped water-cooled burner 5 is arranged at a rear end of the lower flow equalizing plate 4. The combustion chamber 6 is arranged at a rear end of the comb-shaped water-cooled burner 5. The hearth tube bundles 7 are arranged in the ladder-shaped convergent hearth 8, and the hearth tube bundles 7 form an inner loop with a working medium water-steam mixture in a hearth water tank 9.

In some embodiments, the reversed flow-swirl mixer 1 may include inner side convergent air-swirl vanes 1b arranged at an air inlet and outer side divergent air-swirl vanes 1a which may be arranged at the air inlet, and gas swirl vanes 1c which may be arranged at the gas mixture outlet and may be provided with a swirl channel. The opposite mixing of swirls of the natural gas and the air may be performed between an air-swirl outlet and a natural gas swirl outlet; and the inner side convergent air-swirl vanes 1b may be fixed to the reversed flow-swirl mixer 1 through wrapping and clamping of the outer side divergent air-swirl vanes 1a.

In some embodiments, the flow deflector 2 may be of two layer structure and may be divided into an inner side portion, a middle side portion and an outer side portion. The inner side portion may have a radius of $R_1$, the middle side portion may have a radius of $R_2$, and the outer side portion may have a radius of $R_3$. The flow deflector 2 that may be of two layer structure may be coaxially arranged to trisect a flow area of the flow deflector 2, that is, $R_3=3R_1$ and $R_2=2R_1$.

In some embodiments, the upper flow equalizing plate 3 and the lower flow equalizing plate 4 may be both provided with circular holes distributed in a staggered manner.

In some embodiments, the comb-shaped water-cooled burner 5 may include a plurality of comb-shaped water-cooling modules 5b. Both sides of each of the comb-shaped water-cooling modules 5b may be of a comb shape, and each of Y-shaped airflow channels 5c may be formed by two of the comb-shaped water-cooling modules 5b which may be dense and parallel.

In some embodiments, an inlet of each of the Y-shaped airflow channels 5c may be a flat rectangular. An outlet of each of the Y-shaped airflow channels may be a divergent channel, and a spiral ring rib 5d may be arranged in an outlet elliptical swirl channel. The two of the comb-shaped water-cooling modules 5b may be connected by means of a flow equalizing partition plate 5e. And a plurality of rows of the hearth tube bundles 7 may be arranged in the ladder-shaped convergent hearth 8 at a front end of the exhaust port 10, and a number of the plurality of rows of the hearth tube bundles 7 may be reduced row by row.

In some embodiments, an inlet of each of the Y-shaped airflow channel 5c may be of a flat rectangular, and an outlet of each of the Y-shaped airflow channel may be a rectangular channel. The flow equalizing partition plate 5e may be installed at a front end of an inlet of the comb-shaped water-cooled burner 5, and the gas mixture may be fed into the comb-shaped water-cooled burner 5 to play a secondary anti-backfire role after being uniformly mixed for a second time.

In some embodiments, a row of combustion chamber water-cooling tube bundles 6a may be arranged on a central axial plane of an outlet of the comb-shaped water-cooled burner 5 to separate the combustion chamber 6 into double combustion chambers.

In some embodiments, cooling water from both the comb-shaped water-cooled combustor 5 and the combustion chamber 6 may be mixed in a water collecting tank 11 and discharged from an outlet water tank 12 by means of an outer loop heat exchanger 9a.

In some embodiments, a fixed included angle θ may be between a wall surface of the ladder-shaped convergent hearth 8 and a flue gas flowing direction, and the fixed included angle may be greater than 0 degrees and less than 90 degrees.

The hearth tube bundles 7 in the hearth water tank 9 may be capable of being in a vacuum state, a normal pressure state or a pressure-bearing state.

The present embodiments have the beneficial effects.

To improve the uniformity of the gas mixture, the inner side flow deflector, the middle side flow deflector and the outer side flow deflector are arranged behind the reversed flow-swirl mixer, and the flow deflectors on the three sides divide the gas mixture uniformly to enable the gas mixture to be uniformly mixed and distributed. The upper flow equalizing plate and the lower flow equalizing plate are respectively arranged behind the flow deflectors to enhance the uniform mixing and distributivity. The comb-shaped water-cooled burner is formed by splicing a plurality of single comb-shaped water-cooling modules, with both sides of the single comb-shaped water-cooling module that is of a comb shape. A single gas channel is of a Y-type, and a flat rectangular gas inlet is of an anti-backfire design. The flow velocity is greatly reduced by a divergent gas outlet, the contact heat exchange area is increased through the cooperation of the divergent gas outlet and the spiral ring rib, and thus the water-cooling effect at the root of the comb-shaped water-cooled burner is improved, and the heat exchange is strengthened while stable ignition is achieved. Moreover, a second solution is provided, the flow equalizing partition plate is additionally installed at the front end of the comb-shaped water-cooled burner to equalize the gas flow and play a secondary anti-backfire role. Meanwhile, the Y-shaped gas channel is modified into a rectangular channel, the structure is simplified, and the manufacturing is convenient.

To achieve low-nitrogen combustion better, the whole combustion chamber is divided into a left combustion chamber and a right combustion chamber by means of a row of combustion chamber water-cooling tube bundles in the combustion chamber. Therefore, on this basis, more radiant heating areas may be increased, the heat exchange is strengthened, the temperature in the combustion chamber is better reduced, and the low-nitrogen combustion is achieved.

A ladder-shape convergent hearth is of a convergent ladder-shaped structure at the rear end of the combustion chamber and is internally provided with the hearth tube bundles. In this way, the flow velocity of the flue gas is guaranteed, the heat exchange capacity of the tube bundles is improved, the usage amount of the steel is reduced, and the cost is lowered. The boiler can be divided into a vacuum boiler, a normal pressure boiler, or a pressure-bearing boiler based on an indoor operating state of the hearth water tank at the upper side of the ladder-shaped convergent hearth.

On the basis of the premixed combustion technology, by employing the water-cooling technology, the combustion and heat exchange are strengthened, and the generation of $NO_x$ is reduced.

Figure 1:
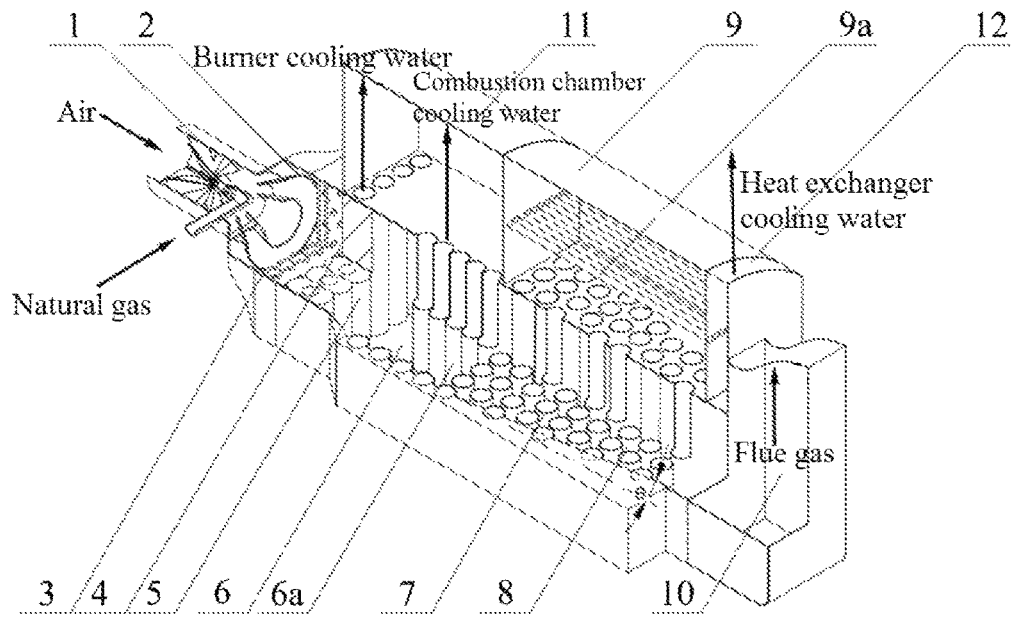
FIG. 1 shows a sectional view of ¼ of a premixed low-nitrogen gas boiler in accordance with the present disclosure.
Figures 2A, 2B:
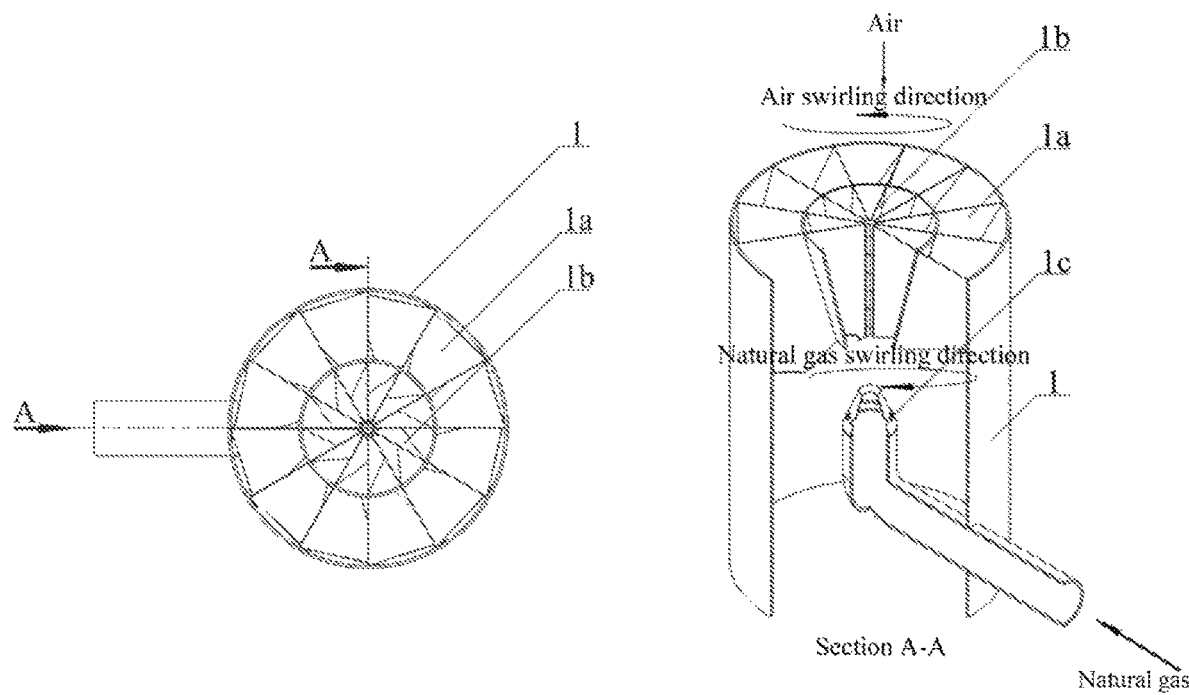
FIG. 2A shows a top view of a reversed flow-swirl mixer in accordance with the present disclosure.
FIG. 2B shows a sectional view taken along line A-A in FIG. 2A.
Figure 3A:
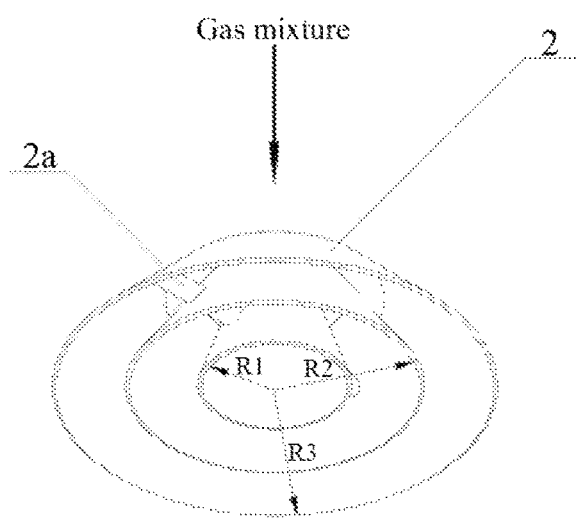
FIG. 3A shows a sectional view of a flow deflector in accordance with the present disclosure.
Figure 3B:
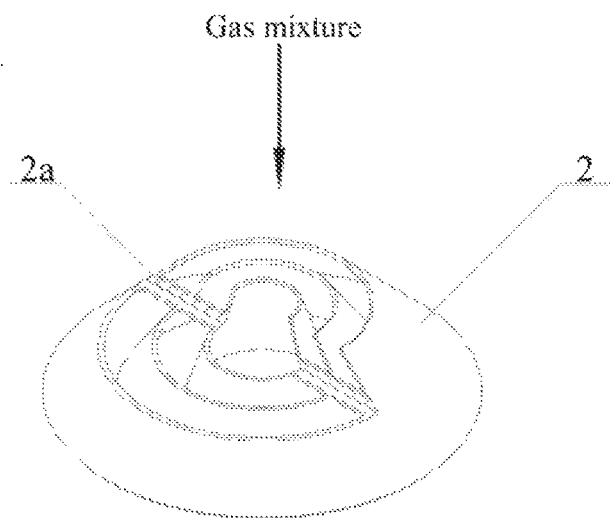
FIG. 3B shows an overall schematic diagram of the flow deflector in accordance with the present disclosure.
Figure 4A:
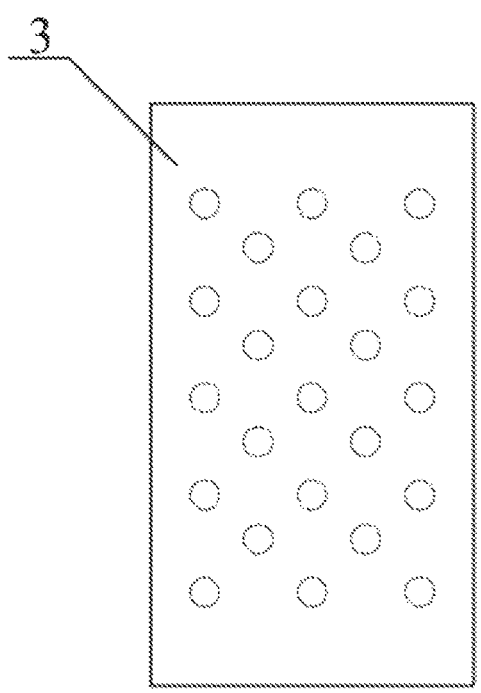
FIG. 4A shows a schematic diagram of an upper flow equalizing plate in accordance with the present disclosure.
Figure 4B:
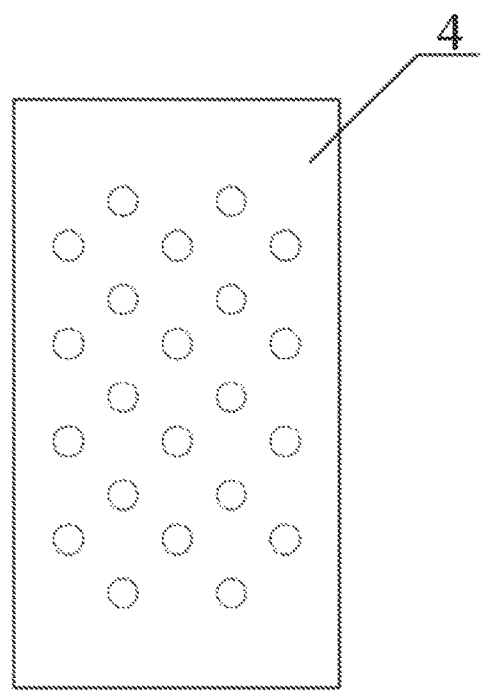
FIG. 4B shows a schematic diagram of a lower flow equalizing plate in accordance with the present disclosure.

List of the reference characters: 1 reversed flow-swirl mixer; 1a outer side divergent air-swirl vane; 1b inner side convergent air-swirl vane; 1c gas swirl vane; 2 flow deflector; 2a flow deflector support frame; 3 upper flow equalizing plate; 4 lower flow equalizing plate; 5 comb-shaped water-cooled burner; 5a burner cooling water tube; 5b comb-shaped water-cooling module; 5c Y-shaped airflow channel; 5d spiral ring rib; 5e flow equalizing partition plate; 6 combustion chamber; 6a combustion chamber water-cooled tube bundle; 7 hearth tube bundle; 8 ladder-shaped convergent hearth; 9 hearth water tank; 9a outer loop heat exchanger; 10 exhaust port; 11 water collecting tank; 12 outlet water tank.

DETAILED DESCRIPTION OF THE EMBODIMENTS

The present disclosure is further described in detail below with reference to the accompanying drawings.

Referring to FIG. 1 to FIG. 8, a premixed low-nitrogen gas boiler is provided. A reversed flow-swirl mixer can achieve the opposite mixing of the natural gas and the air and guarantee the uniformity of the gas mixture. The combustion temperature and the $NO_x$ generation are significantly reduced after the gas mixture is subjected to combustion by the comb-shaped water-cooled burner 5. The premixed low-nitrogen gas boiler includes the reversed flow-swirl mixer 1, outer side divergent air-swirl vanes 1a, inner side convergent air-swirl vanes 1b and gas swirl vanes 1c, and is configured to achieve the opposite mixing of swirls of the natural gas and the air. The gas mixture is uniformly mixed after passing through a flow deflector 2, and then enters the comb-shaped water-cooled burner 5 behind a lower flow equalizing plate 4, and spiral ring ribs 5d can increase the turbulence degree of the gas mixture, enhance the heat exchange effect and ensure low-temperature combustion. Meanwhile, it is guaranteed that the entrained high-temperature flue gas can be stably ignited and combusted under low load.

Meanwhile, a second solution is provided. The divergent channels of Y-shaped airflow channels 5c are totally changed into rectangular channels. The structure is simplified, the manufacturing is convenient, and the cost is saved. Flow equalizing partition plates 5e are additionally installed at the front end of the comb-shaped water-cooled burner 5, the gas mixture is fed into the comb-shaped water-cooled burner 5 to play a secondary anti-backfire role after being uniformly mixed for the second time. The water-cooling heat exchange effect of the comb-shaped water-cooling burner 5 and the combustion chamber 6 is adjusted by controlling the amount and flow velocity of the cooling water in burner cooling water tubes 5a and combustion chamber water-cooling tube bundle 6a. The cooling water from the comb-shaped water-cooled burner 5 and the combustion chamber 6 is mixed in the water collecting tank 11 and then discharged from an outlet water tank 12 by means of an outer loop heat exchanger 9a. Hearth tube bundles 7 form an internal loop with a working medium water-steam mixture in a hearth water tank 9.

The working principle of the present disclosure is as follows.

The natural gas and the air are subjected to opposite swirl mixing in the reversed flow-swirl mixer 1 and are mixed and distributed equally and uniformly by the flow defector 2. Circular holes of an upper flow equalizing plate 3 and the lower flow equalizing plate 4 are arranged in a staggered manner, such that the mixing of the gas mixture is further enhanced in a channel formed between the upper flow equalizing plate 3 and the lower flow equalizing plate 4. The gas mixture is uniformly mixed before entering the comb-shaped water-cooled burner 5 and is stably combusted in the combustion chamber 6. In the comb-shaped water-cooled burner 5 located behind the lower flow equalizing plate 4, the gas mixture flows in from the rectangular channel of the Y-shaped airflow channel 5c, such that the flow velocity of the gas mixture at the inlet of the rectangular channel is not too low to prevent backfire. Meanwhile, a thermal boundary layer is cut by the spiral ring rib 5d to increase the heat exchange area, and an ignition point of the gas is moved, by the divergent channel, forwards to increase the radiation heat exchange area, thereby reducing the root combustion temperature of the gas and improving the water-cooling heat exchange effect. After the gas mixture is combusted, the flue gas is subjected to heat exchange under double cooling of the comb-shaped water-cooled burner 5 and the combustion chamber water-cooling tube bundles 6a. Meanwhile, the temperature of the flue gas is obviously reduced due to the existence of the comb-shaped water-cooling burner 5, the combustion chamber 6 and the combustion chamber water-cooling tube bundles 6a. After the flue gas enters the ladder-shaped convergent hearth 8, the number of each row of hearth tube bundles 7 and the spacing therebetween are controlled to achieve constant-speed flowing, and thus the convection heat release coefficient is increased to enhance the heat exchange, the steel consumption of the tube bundles is reduced, and the cost is saved.

The inner side and the outer side of the reversed flow-swirl mixer are used for swirling air, the outer side divergent air-swirl vanes 1a can fix the inner side convergent air-swirl vanes 1b to prevent the inner side convergent air-swirl vanes 1b from falling off, the swirl angles of the air and the natural gas are adjusted to make the air and the natural gas be mixed uniformly, thereby guaranteeing the uniformity of gas mixture.

Figure 5:
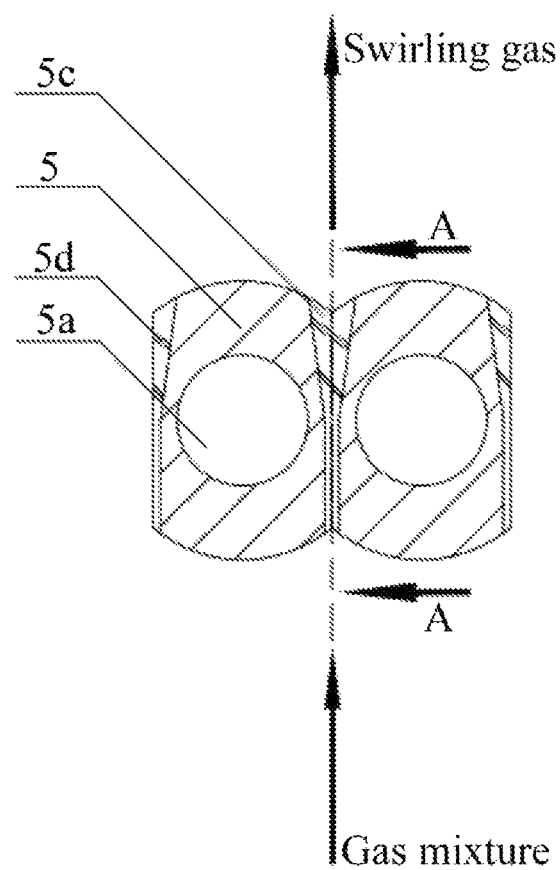
FIG. 5 shows a front view of a comb-shaped water-cooled burner.
Figure 6:
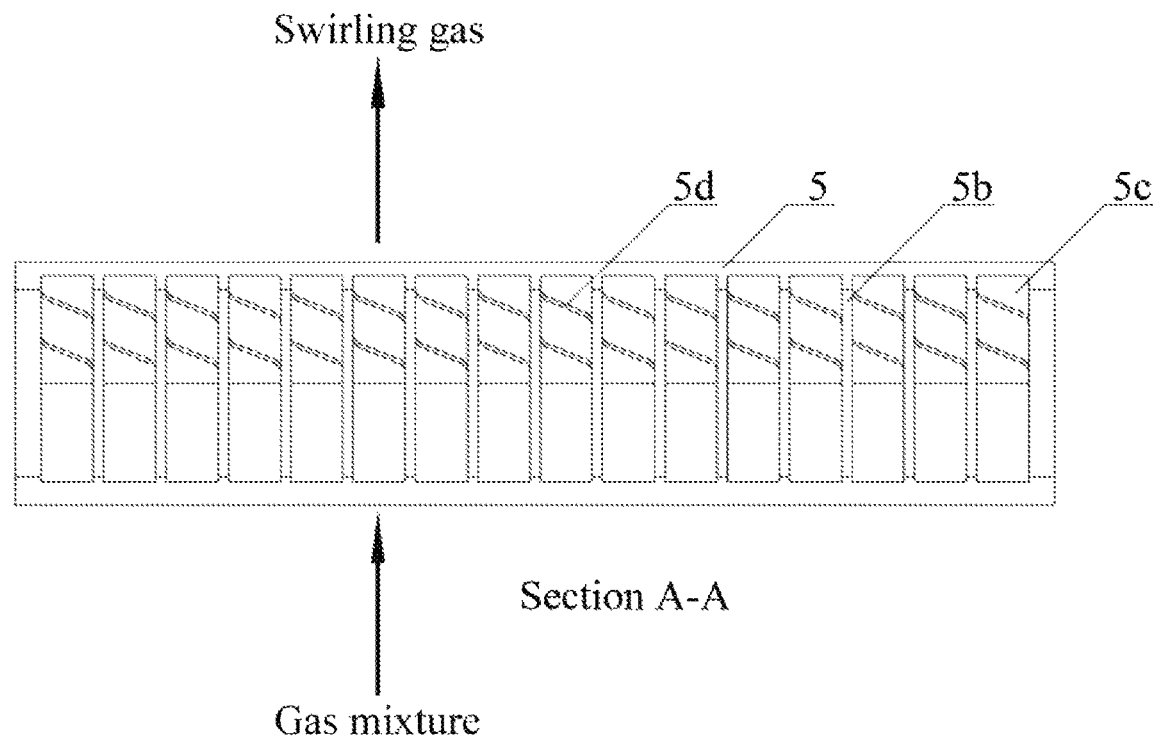
FIG. 6 shows a sectional view of the comb-shaped water-cooled burner taken along line A-A in FIG. 5.

The present disclosure provides two solutions. The first solution is to employ a comb-shaped water-cooled burner 5, as shown in FIG. 5 and FIG. 6. In the burner, the spiral ring ribs 5d are arranged in the Y-shaped airflow channel 5c, thus the turbulence degree of the mixed airflow may be obviously improved, and combustion and cooling are enhanced, the low-load high-temperature flue gas entrainment is guaranteed, and the gas combustion is stabilized better. The Y-shaped airflow channel formed by a plurality of comb-shaped water-cooling modules 5b can greatly reduce the temperature of the flue gas and improve the heat exchange effect.

Figure 7:
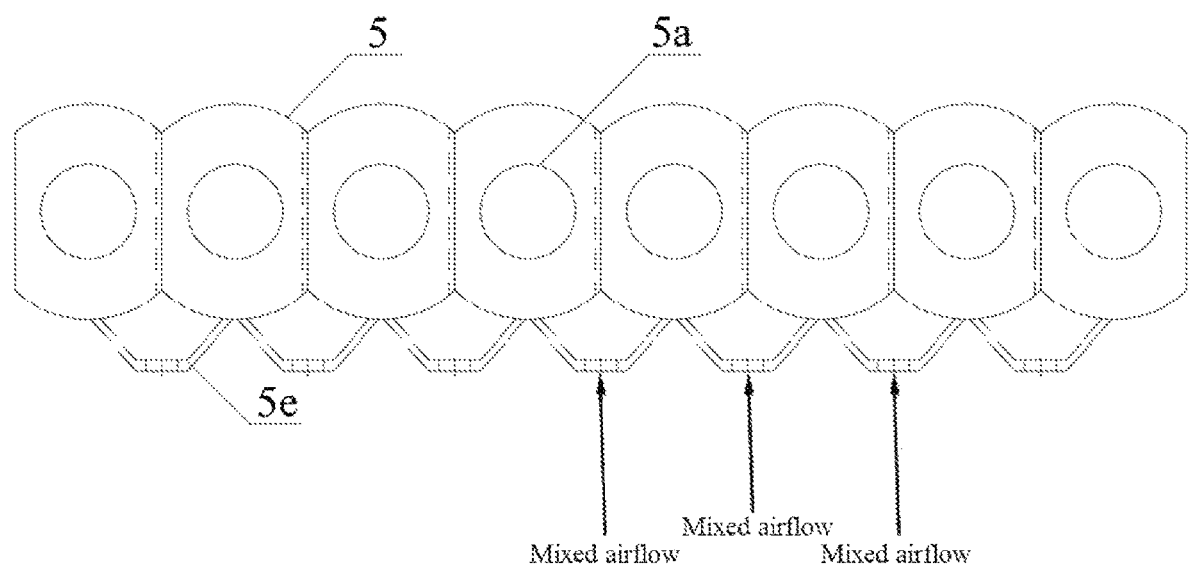
FIG. 7 shows another schematic diagram of a comb-shaped water-cooled burner in accordance with the present disclosure.
Figure 8:
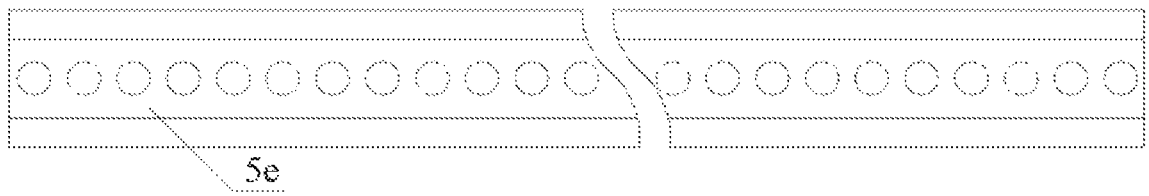
FIG. 8 shows another schematic diagram of a flow equalizing partition plate in accordance with the present disclosure.

The second solution is to change a swirl structure at the upper part in the Y-shaped airflow channel 5c into the same rectangular structure as the lower part and to additionally install the flow equalizing partition plate 5e at a mixed airflow inlet of the comb-shaped water-cooled burner 5, as shown in FIG. 7 and FIG. 8. Only one side of the comb-shaped water-cooled burner 5 is subjected to cut in a rectangular structure, with the advantages of convenient manufacturing and low cost. The connection of a plurality of structures is facilitated, and the purpose of flue gas cooling and backfire prevention may be achieved.

The specific operation mode of the present disclosure is as follows:

Before the gas mixture is introduced into the comb-shaped water-cooled burner 5, cooling water is introduced into the burner water-cooling tube 5a and the combustion chamber water-cooling tube bundles 6a to guarantee the cooling effect thereof. Ignition and combustion may be carried out at the outlet of the burner after the opposite mixing is achieved by the reversed flow-swirl mixer 1. During actual operation, the flame combustion temperature may be controlled to a certain extent by adjusting the amount and flow velocity of the cooling water in the comb-shaped water-cooled burner 5 and the combustion chamber water-cooling tube bundles 6a, and the adjustment can be carried out according to actual working conditions.

The above description is merely for illustration of the technical ideas of the present disclosure and is not intended to limit the scope of protection of the present disclosure. Any modifications made on the basis of the technical solutions according to the technical ideas of the present disclosure, such as the change of the mixer opposing structure, the comb-shaped fin swirl structure, the double-combustion chamber structure and the ladder-shaped convergent hearth structure, shall fall within the scope of protection of the present disclosure.

What is claimed is:

1. A premixed low-nitrogen gas boiler, comprising a reversed flow-swirl mixer (1), a flow deflector (2), an upper flow equalizing plate (3), a lower flow equalizing plate (4), a comb-shaped water-cooled burner (5), a combustion chamber (6), hearth tube bundles (7), a ladder-shaped convergent hearth (8), and an exhaust port (10);

the reversed flow-swirl mixer (1) is capable of opposite mixing of natural gas and air, the flow deflector (2) is arranged at a gas mixture outlet of the reversed flow-swirl mixer (1), the upper flow equalizing plate (3) and the lower flow equalizing plate (4) are arranged below the flow deflector (2), the upper flow equalizing plate (3) is located above the lower flow equalizing plate (4), and a channel for enhancing mixing of gas mixture is formed between the upper flow equalizing plate (3) and the lower flow equalizing plate (4); the comb-shaped water-cooled burner (5) is arranged at a rear end of the lower flow equalizing plate (4), the combustion chamber (6) is arranged at a rear end of the comb-shaped water-cooled burner (5), the hearth tube bundles (7) are arranged in the ladder-shaped convergent hearth (8), and the hearth tube bundles (7) form an inner loop with a working medium water-steam mixture in a hearth water tank (9); and wherein the reversed flow-swirl mixer (1) comprises inner side convergent air-swirl vanes (1b) arranged at an air inlet and outer side divergent air-swirl vanes (1a) which are arranged at the air inlet, and gas swirl vanes (1c) which are arranged at the gas mixture outlet and is provided with a swirl channel, the opposite mixing of swirls of the natural gas and the air is performed between an air-swirl outlet and a natural gas swirl outlet; and the inner side convergent air-swirl vanes (1b) are fixed to the reversed flow-swirl mixer (1) through wrapping and clamping of the outer side divergent air-swirl vanes (1a).

2. The premixed low-nitrogen gas boiler according to claim 1, wherein the flow deflector (2) is of two layer structure and is divided into an inner side portion, a middle side portion and an outer side portion, the inner side portion has a radius of $R_1$, the middle side portion has a radius of $R_2$, and the outer side portion has a radius of $R_3$; and the flow deflector (2) that is of two layer structure is coaxially arranged to trisect a flow area of the flow deflector (2), such that, $R_3=3R_1$ and $R_2=2R_1$.

3. The premixed low-nitrogen gas boiler according to claim 1, wherein the upper flow equalizing plate (3) and the lower flow equalizing plate (4) are both provided with circular holes distributed in a staggered manner.

4. The premixed low-nitrogen gas boiler according to claim 1, wherein the comb-shaped water-cooled burner (5) comprises a plurality of comb-shaped water-cooling modules (5b), both sides of each of the comb-shaped water-cooling modules (5b) are of a comb shape, and each of Y-shaped airflow channels (5c) is formed by two of the comb-shaped water-cooling modules (5b) which are dense and parallel.

5. The premixed low-nitrogen gas boiler according to claim 4, wherein an inlet of each of the Y-shaped airflow channels (5c) is a flat rectangular, an outlet of each of the Y-shaped airflow channels is a divergent channel, and a spiral ring rib (5d) is arranged in an outlet elliptical swirl channel; the two of the comb-shaped water-cooling modules (5b) are connected by means of a flow equalizing partition plate (5e); and a plurality of rows of the hearth tube bundles (7) are arranged in the ladder-shaped convergent hearth (8) at a front end of the exhaust port (10), and a number of the plurality of rows of the hearth tube bundles (7) is reduced row by row.

6. The premixed low-nitrogen gas boiler according to claim 4, wherein an inlet of each of the Y-shaped airflow channel (5c) is of a flat rectangular, and an outlet of each of the Y-shaped airflow channel is a rectangular channel; the flow equalizing partition plate (5e) is installed at a front end of an inlet of the comb-shaped water-cooled burner (5), and the gas mixture is fed into the comb-shaped water-cooled burner (5) to play a secondary anti-backfire role after being uniformly mixed for a second time.

7. The premixed low-nitrogen gas boiler according to claim 1, wherein a row of combustion chamber water-cooling tube bundles (6a) is arranged on a central axial plane of an outlet of the comb-shaped water-cooled burner (5) to separate the combustion chamber (6) into double combustion chambers.

8. The premixed low-nitrogen gas boiler according to claim 1, wherein cooling water from both the comb-shaped water-cooled combustor (5) and the combustion chamber (6) is mixed in a water collecting tank (11) and discharged from an outlet water tank (12) by means of an outer loop heat exchanger (9a).

9. The premixed low-nitrogen gas boiler according to claim 1, wherein a fixed included angle θ is between a wall surface of the ladder-shaped convergent hearth (8) and a flue gas flowing direction, and the fixed included angle is greater than 0 degrees and less than 90 degrees; and the hearth tube bundles (7) in the hearth water tank (9) is capable of being in a vacuum state, a normal pressure state or a pressure-bearing state.

* * * * *